(12) United States Patent  (10) Patent No.: US 8,854,207 B2
Williams  (45) Date of Patent: Oct. 7, 2014

(54) MOBILE LOCK WITH RETRACTABLE CABLE

(71) Applicant: Donald S. Williams, Chicago, IL (US)

(72) Inventor: Donald S. Williams, Chicago, IL (US)

( * ) Notice: Subject to any disclaimer, the term of this patent is extended or adjusted under 35 U.S.C. 154(b) by 0 days.

(21) Appl. No.: 13/927,585

(22) Filed: Jun. 26, 2013

(65) Prior Publication Data

US 2014/0000322 A1 Jan. 2, 2014

Related U.S. Application Data

(60) Provisional application No. 61/667,016, filed on Jul. 2, 2012.

(51) Int. Cl.
| | | |
|---|---|---|
| G08B 1/08 | (2006.01) | |
| B62H 5/00 | (2006.01) | |
| E05B 73/00 | (2006.01) | |
| E05B 39/00 | (2006.01) | |
| E05B 71/00 | (2006.01) | |

(52) U.S. Cl.
CPC ............ *E05B 73/0011* (2013.01); *B62H 5/003* (2013.01); *E05B 39/005* (2013.01); *B62H 5/00* (2013.01); *E05B 71/00* (2013.01)
USPC ..................... 340/539.13; 340/542; 340/568.1

(58) Field of Classification Search
None
See application file for complete search history.

(56) References Cited

U.S. PATENT DOCUMENTS

| | | | |
|---|---|---|---|
| 3,969,914 A | 7/1976 | Dennen | |
| 3,982,413 A | 9/1976 | Stone et al. | |
| 4,028,916 A | 6/1977 | Pender | |
| 4,044,577 A | 8/1977 | Horlacher | |
| 4,126,024 A | 11/1978 | Timmons et al. | |
| 4,188,808 A | 2/1980 | Valdez | |
| 4,683,729 A | 8/1987 | Rogers | |
| 4,823,568 A | 4/1989 | Rogers et al. | |
| 4,970,882 A * | 11/1990 | Arrendondo | 70/30 |
| 5,270,681 A | 12/1993 | Jack | |
| 5,400,622 A | 3/1995 | Harmon | |
| 5,408,212 A * | 4/1995 | Meyers et al. | 340/427 |
| 5,598,727 A | 2/1997 | White | |
| 5,624,129 A | 4/1997 | Clark, Jr. | |
| 5,678,435 A | 10/1997 | Hodson | |
| 6,161,403 A | 12/2000 | Surratt | |
| 6,237,376 B1 | 5/2001 | Surratt | |
| 6,321,961 B1 | 11/2001 | McDaid et al. | |
| D451,368 S | 12/2001 | Hardesty | |
| 6,536,246 B2 | 3/2003 | Wilson et al. | |
| 6,539,759 B2 | 4/2003 | Pershall | |
| 6,550,293 B1 * | 4/2003 | Delegato et al. | 70/59 |
| 6,578,394 B2 * | 6/2003 | Yin | 70/58 |

(Continued)

*Primary Examiner* — Travis Hunnings
(74) *Attorney, Agent, or Firm* — Lesavich High-Tech Law Group, S.C.; Stephen Lesavich

(57) ABSTRACT

A mobile lock with a retractable cable. The mobile lock is an integral component of a mobile device (e.g., bicycle, scooter, stroller, etc.) or attachable thereto and includes retractable cable that is wrapped around a stationary object (e.g., tree, bike rack, etc.). The retractable cable reconnects to a lock component on a body component of the mobile lock to prevent theft of the mobile. The mobile lock is always available for locking the mobile device. The mobile lock also includes an integral wireless locator system that can precisely locate the mobile device in real-time if stolen. The wireless locator system also automatically send messages (e.g., e-mail, text, instant messages, voice, etc.) and make automatic posts to social networking sites (e.g., FACEBOOK, TWITTER, etc.) and social shopping sites (CRAIG'S LIST, E-BAY, etc.) that the mobile device has been stolen.

23 Claims, 11 Drawing Sheets

(56) References Cited

U.S. PATENT DOCUMENTS

| | | |
|---|---|---|
| 6,595,031 B2 | 7/2003 | Wilson et al. |
| 6,637,244 B2 | 10/2003 | Haraughty |
| 6,840,558 B1 | 1/2005 | Darbishire et al. |
| 8,065,895 B2 * | 11/2011 | Andersen .......... 70/14 |
| 8,463,765 B2 | 6/2013 | Lesavich |
| 8,773,267 B2 * | 7/2014 | Conti et al. ........ 340/572.1 |
| 2010/0200630 A1 | 8/2010 | Yu |
| 2011/0012729 A1 | 1/2011 | Hess |
| 2011/0208710 A1 | 8/2011 | Lesavich |
| 2012/0278622 A1 | 11/2012 | Lesavich et al. |
| 2013/0034217 A1 | 2/2013 | Bookstaff et al. |
| 2013/0034224 A1 | 2/2013 | Bookstaff et al. |
| 2013/0034225 A1 | 2/2013 | Bookstaff et al. |
| 2013/0060591 A1 | 3/2013 | Meegan |

* cited by examiner

MOBILE LOCK WITH RETRACTABLE CABLE

CROSS REFERENCES TO RELATED APPLICATIONS

This U.S. Utility patent application claims priority to U.S. Provisional patent application 61/667,016, filed Jul. 2, 2012, the contents of which are incorporated by reference.

FIELD OF INVENTION

The invention relates to security locks. More specifically it relates to mobile locks. The mobile lock also includes an integral wireless locator system that can precisely locate the mobile device in real-time if stolen.

BACKGROUND OF THE INVENTION

Bicycles are typically ridden to a location and left by a rider. The bicycles are typically locked to a stationary objects such a bike racks, poles, trees, benches, etc. to prevent theft.

There are several problems associated bicycles locks. One problem is that the lock has to be purchased separately from the bicycle. Another problem is that a rider of a bicycle has to remember to carry the bicycle lock with them. Another problem is that many bicycle locks are heavy and cumbersome to carry around. Another problem is that a "one-size fits all" bike lock does not work for certain types of bicycle. Another problem is that many locks are subject to destruction with tools such as bolt cutters, torches, etc. allowing a bicycle to be stolen when the lock is destroyed.

There have been attempts to solve some of the problems associated with bicycle locks. For example, U.S. Pat. No. 3,969,914 that issued to Dennen discloses "A hinged cord locking device is adapted to be clamped onto the support bar of an article to be locked such as one of the frame bars of a bicycle. The cord may be withdrawn from a spring retractable reel, wrapped around a stationary object and the locking bolt on free end of the cord locked in a locking channel in the hinged body portion of the device to thereby affix the article to the object. The hinged body portions rotatably support the two piece cable reel which is positively interlocked with the body portions to prevent removal thereof from the support bar. The locking channel is defined by the two body portions such that insertion of the locking bolt into the channel locks the cord to the body portions, the hinged body portions together and the cable reel to the body portions. When so locked, the locking device cannot be removed by opening or sliding axially off a support bar."

U.S. Pat. No. 4,028,916 that issued to Pender discloses "A key operated locking unit is permanently attached to a bicycle frame member. A flexible tether has one end permanently secured to the bicycle locking unit and has a plug-in lock element on its free end adapted to enter a receiver on the locking unit after first being looped around a stationary anchoring member and around part of the bicycle frame. Locking of the bicycle becomes essentially a one hand operation in the shortest possible time."

U.S. Pat. No. 4,044,577 that issued to Horlacher discloses "An automatic anti-theft device or lock is secured to a support of a portable apparatus to secure the apparatus against theft. The lock has two mating halves secured together to form a shatter-proof casing. One casing half includes a hollow spindle integral with the inside wall of the casing half, a retractile reel mounted on the spindle with a cable secured at one end thereto and wrapped around the reel. The second free end of the cable extends through one wall of the casing. The second casing half mounts a lock mechanism having a rotatable lock member which extends into the spindle when the casing halves are joined. The free end of the cable includes a lock cylinder which aligns with the rotatable lock member when it is inserted into the first casing half, and is secured by the rotatable lock member. The first casing member includes a slidable latch which is spring-biased to a first position to engage and latch the reel against rotation. The latch may be moved against the spring bias when the free end of the cable is not engaged in the casing to allow the reel to move and the cable to be extended or retracted. When the cable is at the desired extended position, the latch is released to secure the reel and the lock cylinder is inserted into the casing which prevents the latch from being moved from the first position. The cable is secured around some immovable object before it is inserted into the casing."

U.S. Pat. No. 4,126,024 that issued to Timmons discloses "This disclosure encompasses a cable lock which is particularly suited for securing a bicycle. The lock employs a continuous cable which is wound around a cylinder which is contained in a housing. One end of the cable enters the side wall of the cylinder and exits through an open end. The other end passes out through a hole in the housing. A spring, wound around another portion of the cylinder, maintains a spring load on the cable. Thus, retraction of the cable is possible upon extension and release thereof. The ends of the cable are fashioned into loops which are of a size to maintain it outside of the housing. In the locked condition, the loops are secured by a padlock. A mounting bracket as well as a flange with an opening for storing a padlock is also provided."

U.S. Pat. No. 4,970,882 that issued to Arrendondo discloses "A locking apparatus suitable for securing a bicycle and which can be mounted on a bicycle frame. The apparatus includes a housing containing a pair of axially aligned independently rotatable cable storage reels. Retractable cables are fixed at one end to each reel and exit the housing through apertures in the external wall. Each cable can be separately dispensed through its respective aperture and can be of sufficiently length to secure the bicycle to a stationary object or to be threaded through the frame, the spokes of the wheel, and around a post or other permanently affixed object, with the two free ends of the cable being fastenable to each other by a combination lock, padlock, or other locking means."

U.S. Pat. No. 5,270,681 that issued to Jack discloses "A bicycle and bicycle elements theft alarm apparatus which can be attached to a bicycle assembly to activate an alarm member on unauthorized movement, theft of elements of the object, and entire theft of the object. The bicycle theft alarm apparatus includes a housing assembly having an alarm assembly and a control circuit assembly mounted therein. The alarm assembly includes 1) an actuator key pad assembly operable with a secret code for operation thereof; 2) a wheel release actuator member to indicate unauthorized removal of a bicycle support wheel assembly; 3) a seat release actuator member to indicate unauthorized removal of a bicycle support seat assembly; 4) a cable motion detector assembly operable to detect unauthorized detachment from an immovable object used as an anchor member; and 5) a motion detector assembly operable to detect unauthorized vertical or lateral movement of the bicycle assembly."

U.S. Pat. No. 5,598,727 that issued to White discloses "A lock for a bicycle or the like comprises a first fixed casing member which is adapted to be secured to the frame member of a bicycle or the like and a second casing member which is movable relative to the first casing member. The first casing member is cup-shaped and is provided with frame mounting means on the outer surface of the cup wall. A raised boss extends from the base of the cup-shaped member. The second casing member is adapted to fit into the first casing member and to engage with the boss in such a manner that the second member is rotatable with respect to the first member. One end of a wire or cable is secured to the second casing member and the wire or cable is wound around the periphery of the second member. The other end of the wire or cable extends through a slot in the side wall of the first casing member. A lock is provided with which the other end of the wire or cable is engageable and a coil spring is arranged to act on the second casing member, to cause it to rotate with inspect to the first casing member to draw the wire or cable into the first casing member by being wound around the periphery of the second member as the latter is rotated by the coil spring. Visual and audible alarm means are desirably provided which are arranged to be activated if the wire or cable is pulled or cut."

U.S. Pat. No. 5,678,435 that issued to Hodson discloses "A bicycle locking mechanism is provided including a tubular member which may form part of a bicycle frame, such as the tubular seat post, for example, and an elongated, collapsible, securing element for securing the bicycle frame to an object such as a post or bicycle rack. The elongated, collapsible, securing element has first and second ends and is collapsed in size to a length which is no greater than the length of the tubular member. The securing element fits substantially within the tubular member, when not in use, and is of sufficient length when withdrawn from the tubular member to wrap around an object for securing the bicycle frame thereto. A hinge pin assembly is provided for attaching the first end of the securing element to the tubular member. The securing element may be an elongated, interconnected, linkage assembly or it may consist of a flexible cable."

U.S. Pat. No. 8,065,895 that issued to Andersen discloses "A bicycle lock device for public use is disclosed. The device is comprised of an enclosure, a retractable reel with a retractable cable, a lock/unlock device having a first member attached to the cable free end, and a second member secured in the enclosure, and a lock control device. The user accesses the device by inserting a payment such as a coin or credit card in a user interface of the device. If the payment is accepted, the user then enters a user-specified key code in a keypad on the lock control device. The lock control device unlocks the lock/unlock device. The retractable cable may then be extended. The user weaves the cable through the bicycle components and then enters the cable free end into the lock/unlock device, thereby locking the lock/unlock device and securing the bicycle. When the user later enters the key-code, the device unlocks the cable."

U.S. Published Application No. 20100200630 published by Yu discloses "An adapting apparatus for mounting an accessory equipment on a bicycle is disclosed. The adapting apparatus comprises: a base having a mounting mechanism, a securing mechanism and a lock; an adaptor detachably mounted to the mounting mechanism of the base, the adaptor having an adapting mechanism for connecting to an accessory equipment; and a securing member detachably connected to the base through the securing mechanism and fastened to a portion of a bicycle; wherein, the lock, the mounting mechanism and the adaptor being configured such that the adaptor can be detached from the mounting mechanism only when the lock is unlocked."

U.S. Published Application No. 20110012729 published by Hess discloses "A portable alarm device includes a portable enclosure, a wireless communication system disposed in the portable enclosure and configured to receive a signal from a monitoring device. The device further includes a processor in communication with the wireless communication system and wherein the processor is configured to initiate an alert when the signal indicates that the portable enclosure is beyond a pre-determined distance from the monitoring device."

However, none of these solutions solves all the problems associated with bicycle locks. Thus, it would be desirable to solve some of the problems associated with bicycle locks.

SUMMARY OF THE INVENTION

In accordance with preferred embodiments of the invention, some of the problems associated with bicycle locks are overcome.

A mobile lock with a retractable cable. The mobile lock is an integral component of a mobile device (e.g., bicycle, scooter, stroller, etc.) or attachable thereto and includes retractable cable that is wrapped around a stationary object (e.g., tree, bike rack, etc.). The retractable cable reconnects to a lock component on a body component of the mobile lock to prevent theft of the mobile. The mobile lock is always available for locking the mobile device. The mobile lock also includes an integral wireless locator system that can precisely locate the mobile device in real-time if stolen. The wireless locator system also automatically send messages (e.g., e-mail, text, instant messages) and make automatic posts to social networking sites (e.g., FACEBOOK, TWITTER, etc.) and social shopping sites (CRAIG'S LIST, E-BAY, etc.) that the mobile device has been stolen and should not be re-sold or purchased.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Mobile Lock with Retractable Cable

Figure 1A:
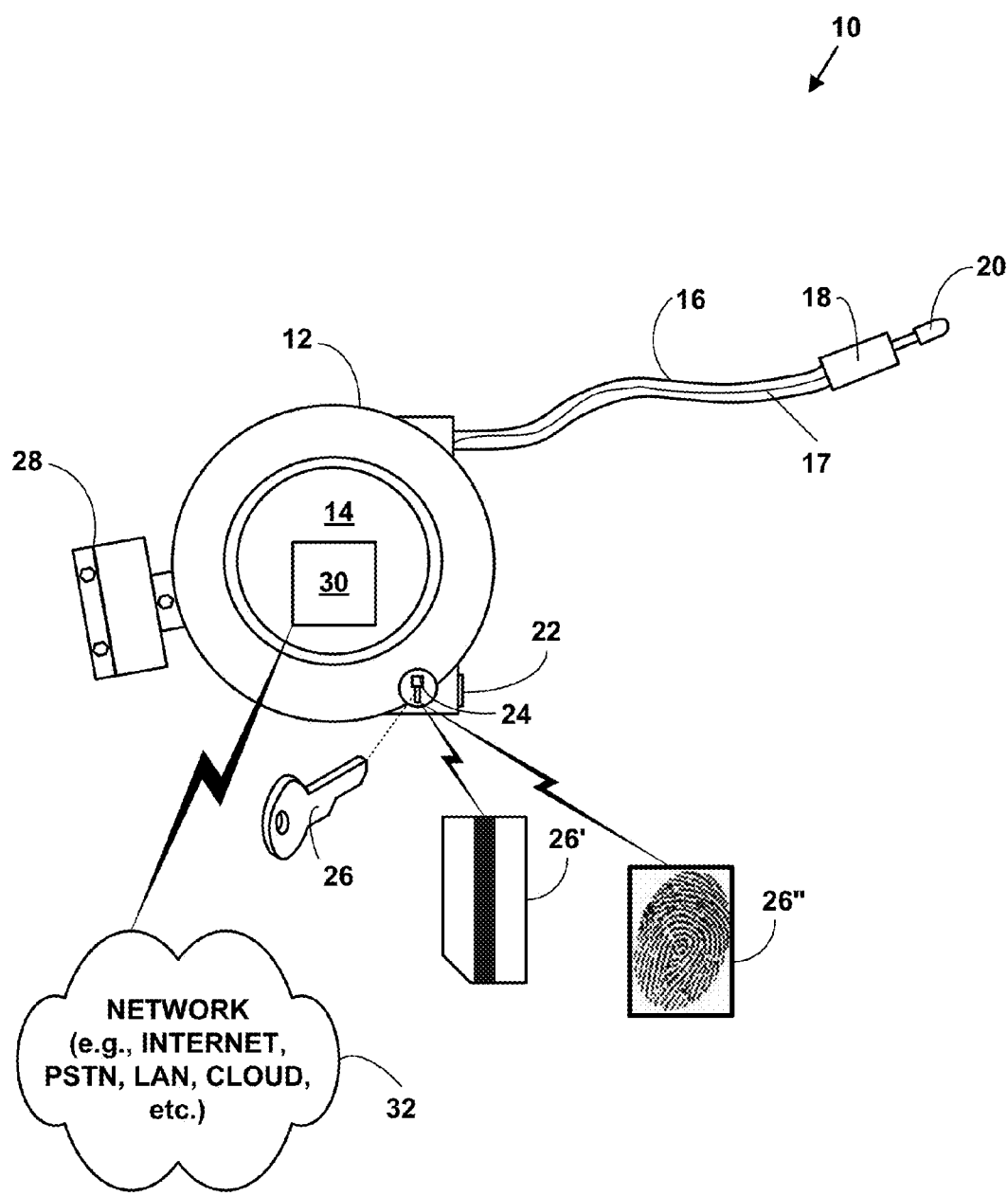
FIG. 1A is a block diagram illustrating a front side view of a mobile lock with a retractable cable extended.

FIG. 1A is a block diagram illustrating a front side view 10 of a mobile lock 12 with a retractable cable 14 extended. FIG.

1B is a block diagram illustrating a front side view 10 of a mobile lock 12 with the retractable cable 14 retracted.

The mobile lock 12 includes a body component 14 with a retractable cable 16. One end of the retractable cable 16 includes a cable lock end component 18, 20, that is insertable into and removeable from a cable attaching component 22 and a second end of the retractable cable attached to a cable retraction component 40 (FIG. 4A) that retracts the retractable cable 16 into the body component 14 when not in use.

One end of the cable lock end component 18 includes a tamper resistant component 18 to prevent tampering at a connection between the cable lock end component 18, 20 and the cable attaching component 22 and a second end of the cable lock end component 20 including an engaging portion of the cable attaching component 22 to securely engage the cable lock end component 18, 20 into the cable attaching component 22.

The cable attaching component 22 is integral to the body component 14 for securely engaging the second end of the cable lock end component 20 of the retractable cable 16 when the retractable cable 16 is being used to secure a mobile device (e.g., bicycle 48, FIG. 5, etc.) to a solid object.

In one embodiment, the cable attaching component 22 is connected to the security interface 102 (FIG. 9) of the location component 30. If the cable attaching component 22 is tampered with, a signal is generated in the security interface 102 that indicates tampering and a potential theft is occurring. The security interface 102 then generates one or more different types of messages sent to the owner of the mobile device and/or emergency personnel and/or law enforcement personal, etc. However, the present invention is not limited to this embodiment and the mobile lock 12 can be used without connecting the cable attaching component 22 to the security interface 102.

Figure 1B:
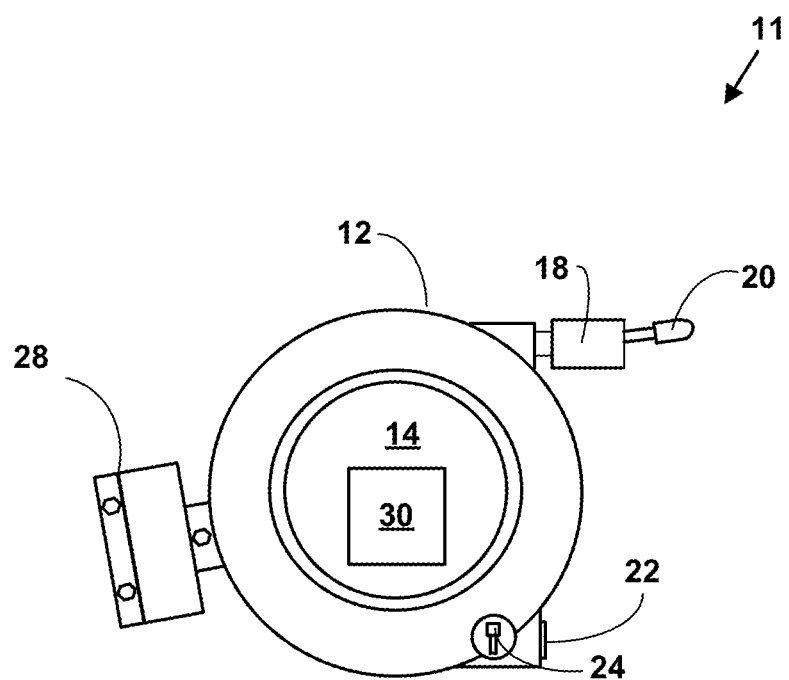
FIG. 1B is a block diagram illustrating a front side view of the mobile lock with the retractable cable retracted.

A cable unlocking component 24 is integral to the body component 14 for unlocking the second end of cable lock end component 20 from the cable lock component 22. The cable unlocking component 24 is illustrated in FIG. 1 as a mechanical component to accept a mechanical key 26. In another embodiment, the cable unlocking component 24 includes an electrical unlocking component that accepts an magnetic signal from a key card 26' that is converted into an electrical signal, an electrical signal from a user biometric 26" or another type of electrical signal (e.g., RF, etc.).

An attachment component 28 connected to the body component 14 for attaching the mobile lock 12 to the mobile device. In one embodiment the attachment component 28 is hardened metal, or tamper resistant plastic and/or tamper resistant composite materials. The attachment component 28 is attached to a mobile device with one or more hardened and/or tamper proof metal and/or composite material attachment means (e.g., bolts, screws, etc.).

In one embodiment, the attachment component 28 is a hinged component (e.g., FIG. 4B, etc.) used as a hinge to allow the mobile lock 12 to be opened. In another embodiment, if the mobile lock 12 is integral 54 (e.g., FIG. 6, etc.) to a mobile device (e.g., included within a frame 52 of a bicycle 48, the attachment component 28 is not necessary and is not used. However, the present invention is not limited to these embodiments and other embodiments can be used to practice the invention.

In one embodiment, the attachment component 28 is connected to the security interface 102 of the location component 30. If the attachment component 28 is tampered with, a signal is generated in the security interface 102 that indicates tampering and a potential theft is occurring. The security interface 102 then generates one or more different types of messages sent to the owner of the mobile device and/or emergency personnel and/or law enforcement personnel. However, the present invention is not limited to this embodiment and the mobile lock 12 can be used without connecting the attachment component 28 to the security interface 102.

A location component 30 located inside the body component 14 includes a circuit configured for providing physical location information of the mobile device and for communicating with a wireless communications network 32.

However, the present invention is not limited the components described and more, fewer of other types of components can be used to practice the invention.

Figure 2:
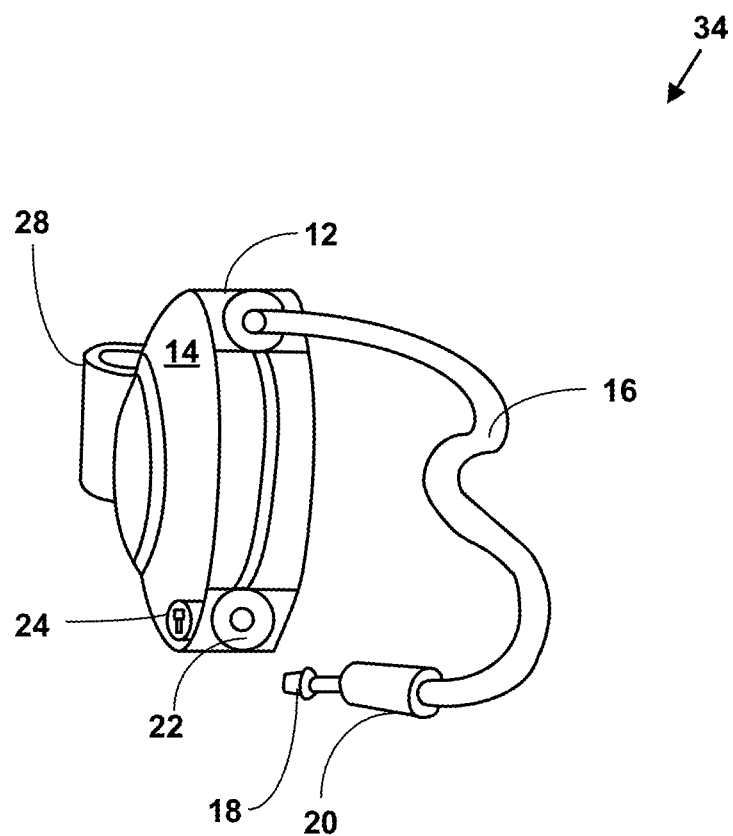
FIG. 2 is a block diagram illustrating a front view of the mobile lock.

FIG. 2 is a block diagram illustrating a front view 34 of the mobile lock 12.

Figure 3:
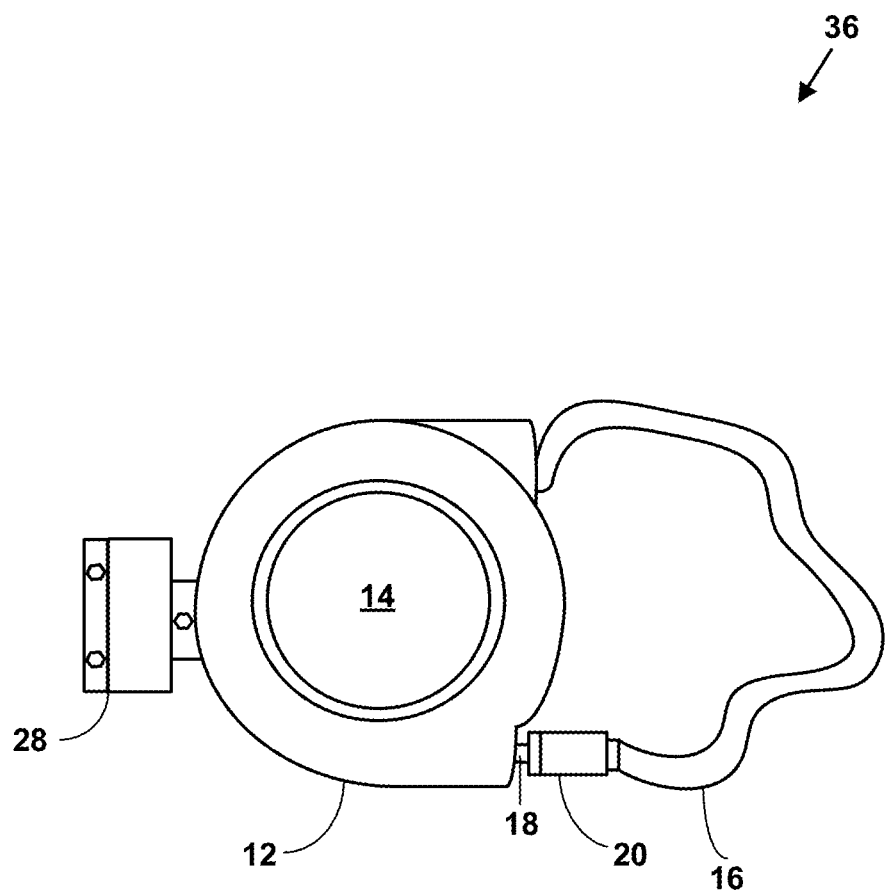
FIG. 3 is a block diagram illustrating a back side view of the mobile lock in a connected configuration.

FIG. 3 is a block diagram illustrating a back side view 36 of the mobile lock 12 in a connected configuration. The cable unlocking component 24 is not visible on the back side view 36.

Figure 4A:
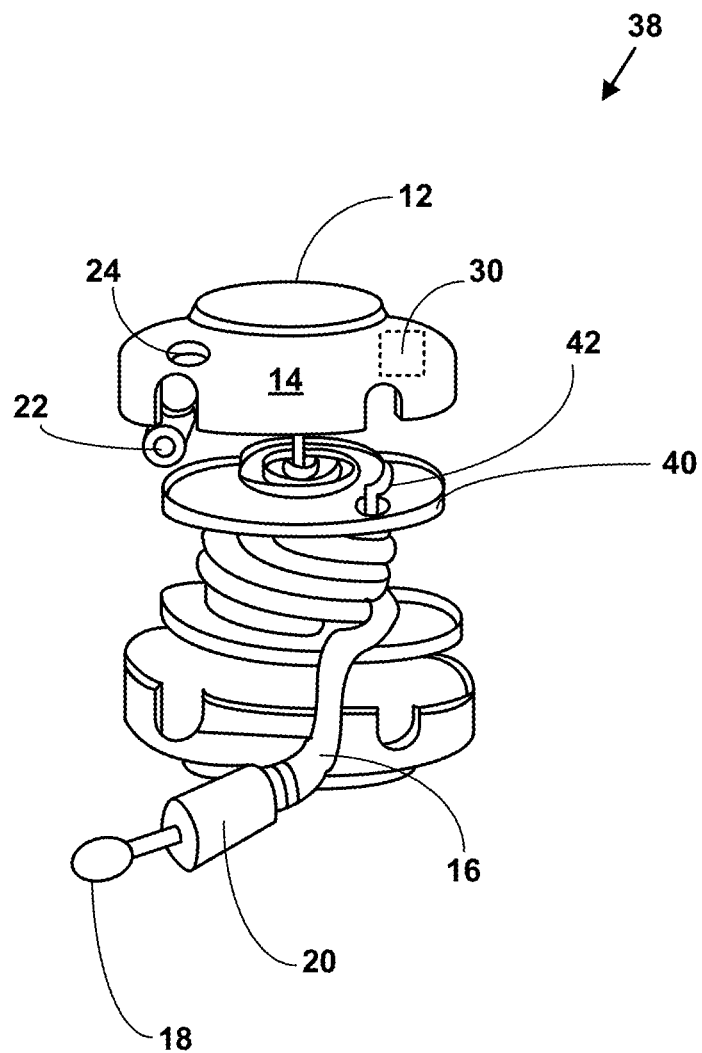
FIG. 4A is a block diagram illustrating an exploded view of the mobile lock.

FIG. 4A is a block diagram illustrating an exploded view 38 of the mobile lock 12. The exploded view 38 includes an extension/retraction mechanism 40 (e.g., a tension and/or torsion spring 42, coil, electrical motor, etc.) to automatically extend and retract the retractable cable 16 and a spindle connected to the extension/retraction mechanism 40 to engage, store and un-engage the retractable cable 16.

Figure 4B:
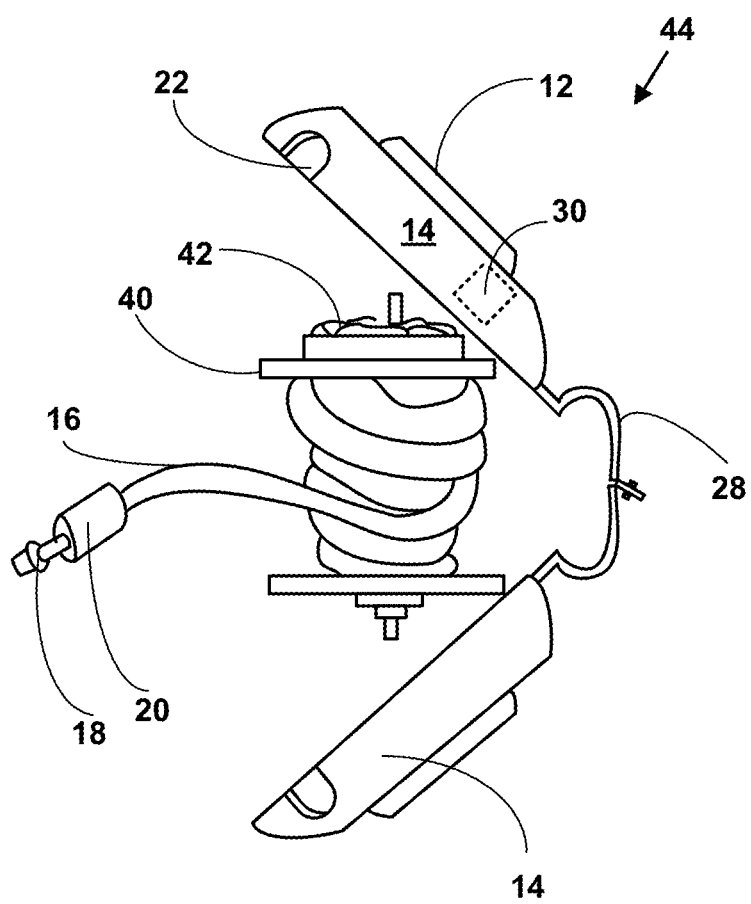
FIG. 4B is a block diagram illustrating another exploded view of mobile lock.

FIG. 4B is a block diagram illustrating another exploded view 44 of the mobile lock 12. This exploded view 44 includes an extension/retraction mechanism 40 (e.g., a tension and/or torsion spring 42, coil, electrical motor, etc.) to automatically extend and retract the retractable cable 14 and a spindle connected to the extension/retraction mechanism 40 to engage, store and un-engage the retractable cable 14.

Figure 5:
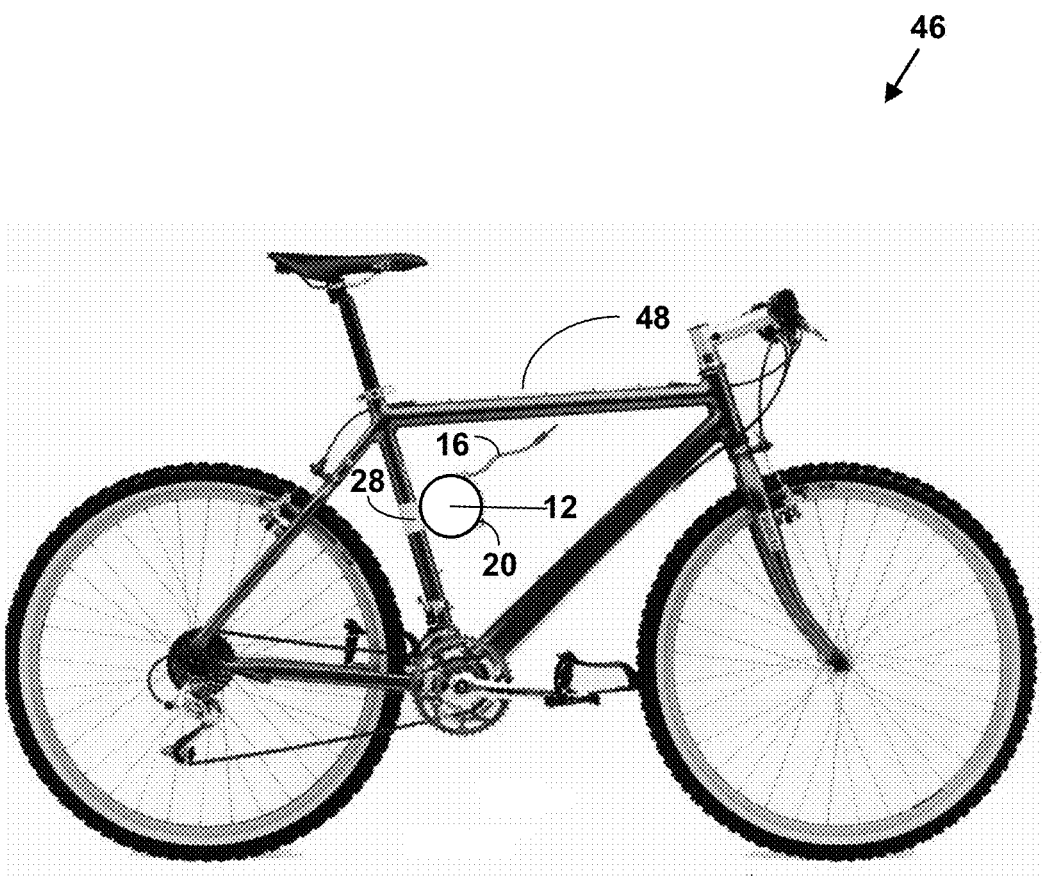
FIG. 5 is a block diagram illustrating a side view of the mobile lock attached to a bicycle with optional attachment component.

FIG. 5 is a block diagram illustrating a side view 46 of the mobile lock 12 attached to a bicycle 48 with external attachment component 26.

Figure 6:
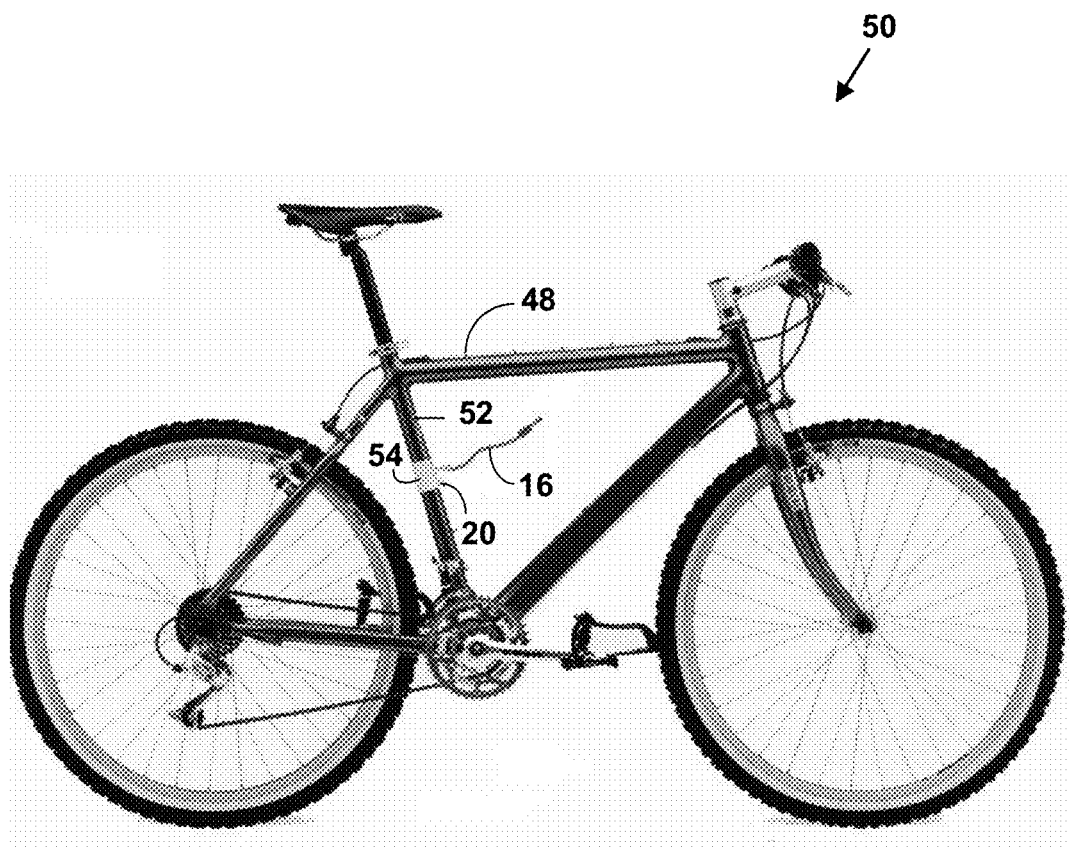
FIG. 6 is a block diagram illustrating a side view of the mobile lock integrally included in a frame of the bicycle.

FIG. 6 is a block diagram illustrating a side view 52 of the mobile lock 12 integrally included in a frame 52 of the bicycle 48. The components of the mobile lock 12 are specifically sized and shaped to fit inside the bicycle 48 frame 52.

Figure 7:
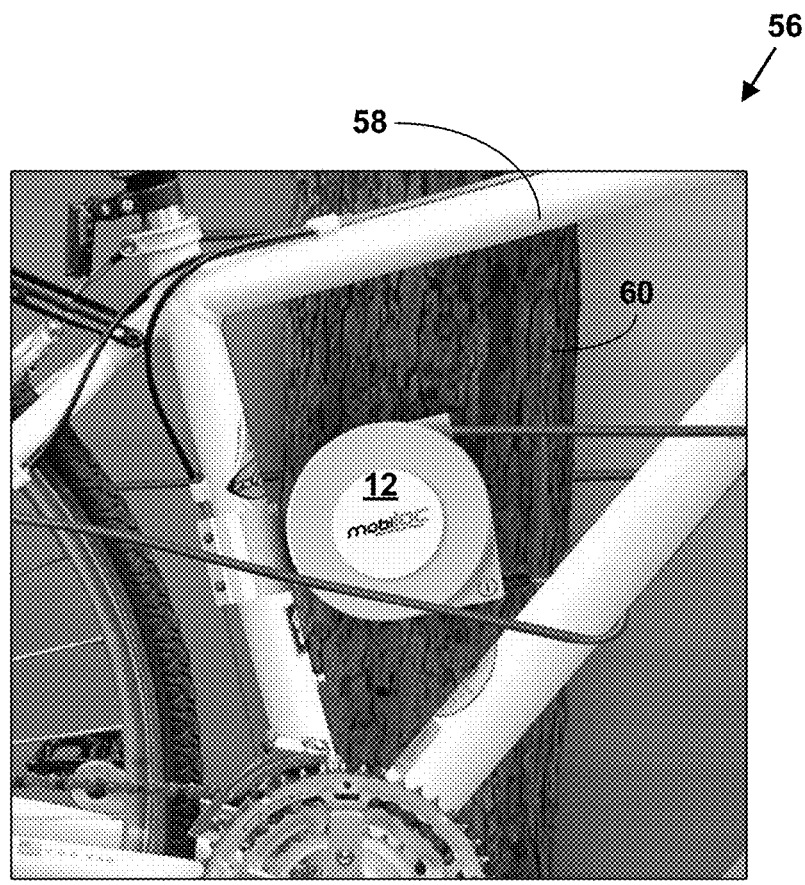
FIG. 7 is a block diagram illustrating a side view of the mobile lock attached to the bicycle and to a tree.

FIG. 7 is a block diagram illustrating a side view 56 of the mobile lock 12 attached to a frame 58 of bicycle 48 and to a tree 60 with retractable cable 16.

Body Component

In one embodiment, the body component 14 is circular and/or oval in shape and includes a mechanical or electrical extension/retraction mechanism 40 for extending and retracting the retractable cable 16. However, the present invention is not limited to such embodiment and other embodiments can be used to practice the invention.

In one embodiment, the body component 14 comprises a metal, plastic, composite material and/or other materials. However, the present invention is not limited to such embodiment and/or materials and other embodiments and/or materials can be used to practice the invention.

The body component 14 includes stamped and/or cast and/or forged metals. The metals include hardened steel, stainless steel and/or other metals.

In another embodiment, the body component 14 includes injection molded, rotation molded, blow-molded, extrude and/or pultruded.

"Injection molding" is a manufacturing process for producing parts from both thermoplastic and thermosetting plastic materials. Material is fed into a heated barrel, mixed, and forced into a mold cavity where it cools and hardens to the configuration of the cavity.

A "thermoplastic" is a polymer that becomes pliable or moldable above a specific temperature, and returns to a solid state upon cooling. Thermoplastics include, but are not limited to, Polyethylene, Polyvinyl chloride, Polypropylene, Polyethylene terephthalate, Polymethyl methacrylate, Polycarbonates, etc.

A "thermosetting plastic" also known as a thermoset, is a polymer material that irreversibly cures. The cure may be done through heat (e.g., above 200° C. (392° F.)), through a chemical reaction (e.g., a two-part epoxy, etc.), or irradiation such as electron beam processing.

"Rotation molding" produces hollow forms with a constant wall thickness. Polymer powder is tumbled around inside the mold to produce virtually stress free parts. Rotation molding includes in-mold graphics and multi-layered wall sections. Rotational molding is also known as "rotomolding," "rotocasting" and spin casting. A heated hollow mold is filled with a charge or shot weight of material, it is then slowly rotated (usually around two perpendicular axes) causing the softened material to disperse and stick to the walls of the mold.

"Blow molding" is a manufacturing process by which hollow plastic parts are formed. In general, there are three main types of blow molding: (1) extrusion blow molding; (2) injection blow molding; and (3) stretch blow molding. The blow molding process begins with melting down the plastic and forming it into a parison or preform. The "parison" is a tube-like piece of plastic with a hole in one end in which compressed air can pass through. The "parison" is then clamped into a mold and air is pumped into it. The air pressure then pushes the plastic out to match the mold. Once the plastic has cooled and hardened the mold opens up and the part is ejected.

Extrusion" is a manufacturing process where a material is pushed through a die to create long objects of a fixed cross-section. Hollow sections are usually extruded by placing a pin or mandrel in the die. Extrusion may be continuous (e.g., producing indefinitely long material) or semi-continuous (e.g., repeatedly producing many shorter pieces). Some extruded materials are hot drawn and others may be cold drawn.

Feedstock for extrusion may be forced through the die by various methods: by an auger, which can be single or twin screw, powered by an electric motor; by a ram, driven by hydraulic pressure, oil pressure or in other specialized processes such as rollers inside a perforated drum for the production of many simultaneous streams of material.

"Pultrusion" is a continuous process for manufacture of materials with a constant cross-section. Reinforced fibers are pulled through a resin, possibly followed by a separate pre-forming system, and into a heated die, where the resin undergoes polymerization. Pultrusion is not limited to thermosetting polymers or polymides. More recently, pultrusion has been successfully used with thermoplastic matrices such either by powder impregnation of fibers or by surrounding it with sheet material of a thermoplastic/polymide matrix, which is then heated.

In one embodiment, body component 14 is produced with an overwrapping transverse winding process that combines continuous filament winding with a pultrusion manufacturing process to produce a pultruded, pullwound body component 14.

The "pullwinding" process incorporates plural longitudinal reinforcement fibrers with plural helical-wound (e.g., hoop, etc.) layers, providing maximum torsional properties and hoop strength. A self-contained inline winding unit is used with a pultrusion machine for feeding angled fibers between layers of unidirectional fibers before curing in a pultrusion die. The plural longitudinal re-enforcement fibers are used for axial and bending resistance while the plural helical-wound fibers are used for hoop tension and compression resistance. The pullwinding equipment is comprised of twin winding heads which revolve in opposite directions over a spindle. However, the present invention is not limited to such an embodiment and other embodiments can also be used to practice the invention.

In one embodiment, the extruded plastic materials included, but not limited to, Polyvinyl Chloride (PVC), Acrylonitrile Butadiene Styrene (ABS), High Impact Polypropylene (HIP), Polypropylene, High-Density Polyethylene (HDPE), Polycarbonate, Polyethylene Terephthalate Glycol (PETG), Nylon, Fiber reinforced Polypropylene, Fiber Reinforced Plystyrene and other types of plastics.

"Composite materials" are engineered or naturally occurring materials made from two or more constituent materials with significantly different physical or chemical properties which remain separate and distinct at the macroscopic or microscopic scale within the finished structure. Common polymer-based composite materials, include at least two parts, a substrate (e.g., fibers, etc.) and a resin.

The composite materials include "Fiber-reinforced polymers" (FRP) including thermoplastic composites, short fiber thermoplastics, long fiber thermoplastics or long fiber-reinforced thermoplastics. There are numerous thermoset composites, but advanced systems usually incorporate aramid fiber and carbon fiber in an epoxy resin matrix. The composite materials also include carbon/carbon composite materials with carbon fibers and a silicon carbide matrix.

The body component 14 is produced in plural different colors (e.g., red, green, yellow, blue, brown, sliver, etc.) and is aesthetically pleasing.

In one embodiment, the body component 14 includes the text "GPS anti-theft equipped." This text is used to alert potential thieves that the body component 14 includes the location component 30 with the GPS chip set 106. The text may be placed on a sticker placed on the body component 14 or included when the body component 14 is manufactured. However, the present invention is not limited to the text described another messages can be used to practice the invention.

In another embodiment, this text is used as an anti-theft method even if the mobile lock 12 does not include the GPS chip set 106. It provides an additional anti-theft deterrent to potential thieves since the GPS chip set 106 is not visible when an exterior of the mobile lock 12 is viewed.

However, the present invention is not limited to these embodiments of the and other embodiments of the body component 14 can be used to practice the invention.

Retractable Cable

The retractable cable 16 comprises a hardened material or resistant material that is difficult to cut with bolt cutters and other types of cutters. In one embodiment, the retractable cable 16 includes a braided cable, wire rope and/or chain covered with a plastic, rubber, composite material and/or other coating. In one embodiment, the coating is resistant to cutting and adds another layer of tamper resistance to the retractable cable 16. However, the present invention is not limited to these coating and the invention may be used with and/or without a coating on the retractable cable 16.

A "braided cable" is a complex structure or pattern formed by intertwining three or more strands of flexible material such as metal wires. A braided cable includes a tubular sheath made of braided strands of metal placed around a central cable. In one embodiment, the braided cable includes a steel and/or composite material braided cable.

"Wire rope" is a type of rope which comprises several strands of metal wire laid (or 'twisted') into a helix. Iron, steel and composite materials are the main materials used for wire ropes.

A "chain" is a series of connected links. The chain includes metal, plastic and/or a composite material.

The retractable cable 16 includes one or more metal wires 17 (e.g., copper, aluminum, etc.) and/or optical wires (e.g., fiber optic wires, etc.) that are attached to the location component 30. The one or more wires 17 (FIG. 1A, etc.) are connected to the security interface 102 of the location component 30. The security interface 102 generates an electrical current through the wires 17. When any of the one or more wires 17 are cut, for example, when a person is trying to cut through the retractable cable 16, a signal is generated in the security interface 102 that indicates tampering and a potential theft is occurring. The security interface 102 then generates one or more different types of messages sent to the owner of the mobile device and/or emergency personnel and/or law enforcement personnel. The one or more wires 17 are illustrated in FIG. 1A as being visible. However, in the actual mobile lock 12 the one or more wires 17 are not visible and thus provide another level of security for the mobile lock 12.

In one embodiment, the one or more wires are integral to and manufactured in a plastic, rubber, composite material or other coating used to cover the retractable cable 16.

However, the present invention is not limited to the retractable cables 16 described and other types of retractable cables 16 can be used to practice the invention.

Cable Lock End Component

The cable lock end component 18, 20 that is insertable/removeable into/from a cable attaching component 22. The cable attaching component 22 includes a mechanical and/or an electrical locking component. The cable lock end component 18 is inserted into the cable attaching component 22 and is captured by a mechanical locking mechanism within the cable attaching component 22. An electrical locking component 22 may include a battery, capacitor, solar cells, or other components to generate and/or store electrical power.

The cable lock end component 18, 20 includes a tamper resistant component 20. The tamper resistant component 20 is a larger diameter than the retractable cable 16 and comprises, metal, rubber, plastic, composite materials and/or other materials. The tamper resistant component 20 helps prevent a tool such as a lock pick, screwdriver, etc. from being inserted into the cable attaching component 22 to prevent, cutting, prying and other tampering with the cable attaching component 22. However, the present invention is not limited to these embodiments and other embodiments can be used to practice the invention.

In one embodiment, the cable attaching component 22 includes a mechanical or electronic fastening/unfastening device that is released with a cable unlocking component 24 by a physical object (such as a mechanical key 28, keycard 26', etc.) and/or an electrical signal 32 (RF signal, Radio Frequency Identifier (RFID), RFID biometric, Bluetooth, Infrared, etc.) or mechanical sequence (e.g., a combination, etc.) and/or secret information (e.g., a keycode, biometric scan 26", password, etc.), or combination of more than one of these. However, the present invention is not limited to these embodiments and other embodiments can be used to practice the invention.

The cable unlocking component 24 is illustrated in FIG. 1 as a mechanical component to accept a mechanical key 26. However, the present invention is not limited to this embodiment. In other embodiments, the cable unlocking component 24 includes a mechanical or electrical combination component, a wireless electrical component (e.g., wireless security circuit, etc.) a biometric reader, (e.g., fingerprint scanner, retina scanner, voice scanner, etc.) a magnetic card scanner and/or other types of unlocking components. However, the present invention is not limited to these embodiments and other embodiments can be used to practice the invention.

In one embodiment, the cable unlocking component 24 is connected to the security interface 102 of the location component 30. If the cable unlocking component is tampered with, a signal is generated in the security interface 102 that indicates tampering and a potential theft is occurring. The security interface 102 then generates one or more different types of messages sent to the owner of the mobile device and/or emergency personnel and/or law enforcement personnel. However, the present invention is not limited to this embodiment and the mobile lock 12 can be used without connecting the cable unlocking component 24 to the security interface 102.

A lock in a rest position is closed. A key has a series of grooves on either side of the key (i.e., the key's blade), which limit the type of lock the key can slide into. As the key slides into the lock, the grooves on the blade of the key align with "wards" in the keyway allowing or denying entry to the cylinder. Then, a series of pointed teeth and notches on the blade called "bittings" allow pins or wafers to move up and down until they are in line with the shear line of the inner and outer cylinder, allowing the cylinder or cam to rotate freely inside the lock and the lock to open.

Radio-frequency identification (RFID) a wireless non-contact system that uses radio-frequency electromagnetic fields to transfer data from an RFID tag to an RFID receiver.

"Bluetooth" is a wireless technology standard for exchanging data over short distances using short-wavelength radio transmissions in the band from 2400-2480 MHz.

"Infra red" data transmission is also employed in short-range communication among computer peripherals. These devices usually conform to standards published by IrDA, the Infrared Data Association. Remote controls and IrDA devices use infrared light-emitting diodes (LEDs) to emit infrared radiation which is focused by a plastic lens into a narrow beam.

A "biometric" is method for uniquely recognizing humans or non-human entities based upon one or more intrinsic physical or behavioral traits. Thus, an RFID biometric tag is an object that can accepts a human biometric (e.g., fingerprint data, voice print data, iris scan data, etc.) for the purpose of identification.

Wireless Connections

In one embodiment, the mobile lock 12 includes one or more different types of wireless interfaces for the unlocking component 24 and the location component 30.

In one embodiment of the present invention, the wireless interfaces include but are not limited to, a Radio Frequency (RF), an Institute of Electrical and Electronic Engineer (IEEE) 802.11a, 802.11b, 802.11g, 802.11n, 802.15.4 (Zig-Bee), 802.16a, 802.16g, "Wireless Fidelity" (WiFi), "Worldwide Interoperability for Microwave Access" (WiMAX), European Telecommunications Standards Institute (ETSI) High Performance Radio Metropolitan Area Network (HIPERMAN), RF-Home, wireless personal area network (WPAN), Radio Frequency Identifier (RFID), Near Field communications (NFC) and/or machine-to-machine (M2M) communications or other types of wireless interfaces. However, the present invention is not limited to such wireless interface and other types of wireless interfaces can also be used.

In another embodiment of the present invention, the wireless interfaces includes a wireless sensor device that comprises an integral or separate Bluetooth and/or infra data association (IrDA) module for wireless Bluetooth or wireless infrared communications.

Radio frequency (RF) wireless signal in the range of about 3 kHz to 300 GHz. 802.11b is a short-range RF wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

WiFi is a type of 802.11xx interface, whether 802.11b, 802.11a, dual-band, etc. WiFi devices include an RF interfaces such as 2.4 GHz for 802.11b or 802.11g and 5 GHz for 802.11a. More information on Wi-Fi can be found at the URL "www.weca.net."

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX (and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX (hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WPAN.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WPAN.

Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

The Infrared Data Association (IrDA) provides specifications for a complete set of protocols for wireless infrared communications. The name "IrDA" also refers to that set of protocols. IrDA is used for wireless data transfer over the "last one meter" using point and shoot principles. Thus, it has been implemented in portable devices such as mobile phones, laptops, cameras, printers, medical devices and many more. Main characteristics of this kind of wireless optical communication is physically secure data transfer, Line-of-Sight (LOS) and very low bit error rate (BER) that makes it very efficient.

A "RFID tag" is an object that can be applied to or incorporated into a vehicle for the purpose of sending unique RF signals.

An "RFID sensor" is a device that measures a physical quantity and converts it into an RF signal which can be read by another circuit.

In one embodiment, the wireless interfaces include wireless personal area network (WPAN) interfaces. A WPAN is a personal area network for interconnecting devices in which the connections are wireless. A WPAN interconnects all the ordinary computing and communicating devices in a vehicle 28

Typically, a WPAN uses some technology that permits communication only within about 10 meters. One such technology is "Bluetooth." Another such technology is "Zigbee."

"Near field communication (NFC)" is a set of standards for smartphones and similar smart network devices to establish radio communication with each other by touching them together or bringing them into close proximity, usually no more than a few inches and/or a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags and/or sensor and/or other types of tags and/or sensors.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as movement of the bicycle, etc.), which is relayed through a network (wireless, wired, etc.) to an application (software program), that translates the captured event into meaningful information.

M2M communication has expanded beyond a one-to-one connection and changed into a system of networks that transmits data many-to-one and many-to-many to plural different types of devices and appliances. The expansion of Internet Protocol (IP) networks has made it far easier for M2M communication to take place and has lessened the amount of power and time necessary for information to be communicated between machines.

Communications Network

Figure 8:
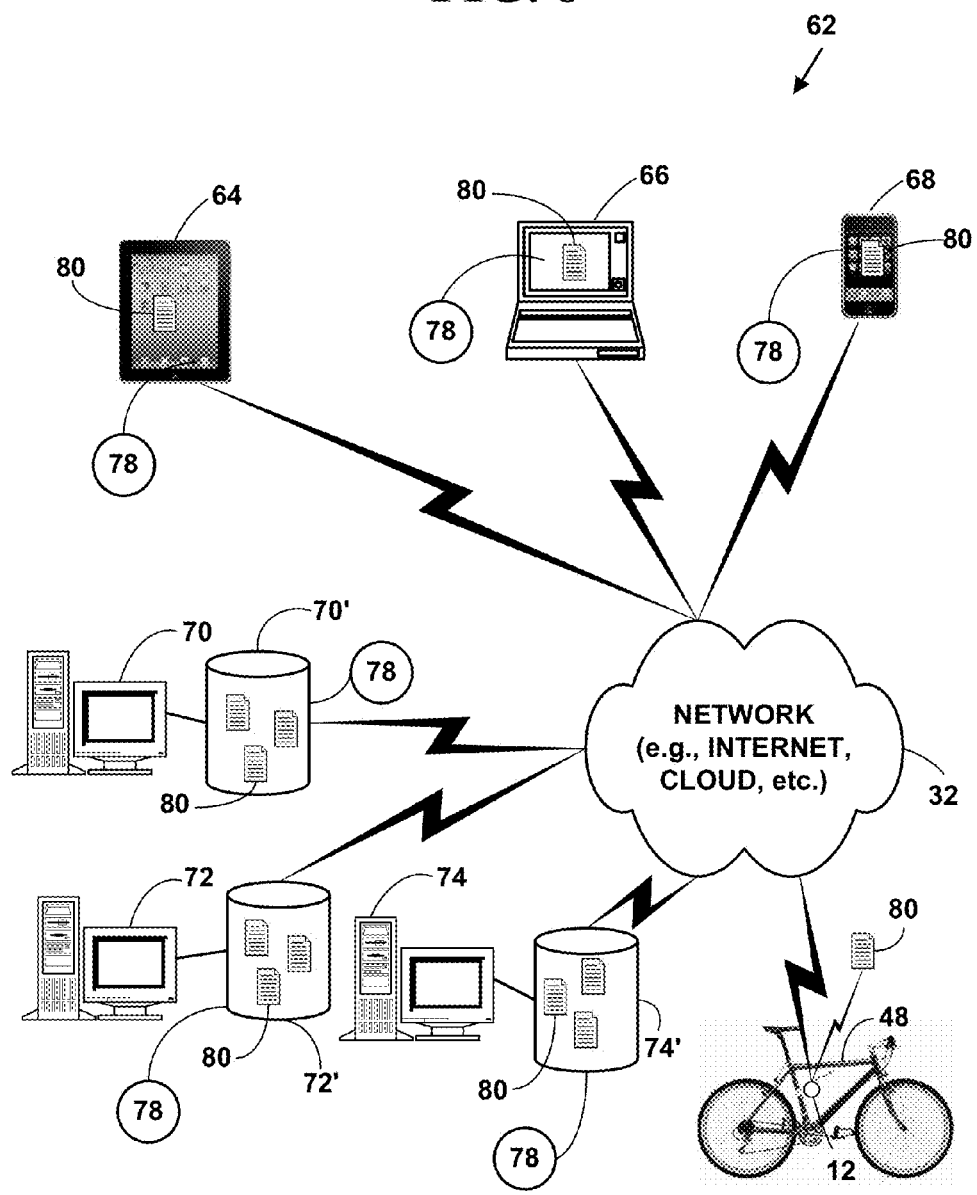
FIG. 8 is a block diagram illustrating a communications network system in communications with the mobile lock.

FIG. 8 is a block diagram illustrating a communications network system 62 in communications with the mobile lock 12.

Figure 9:
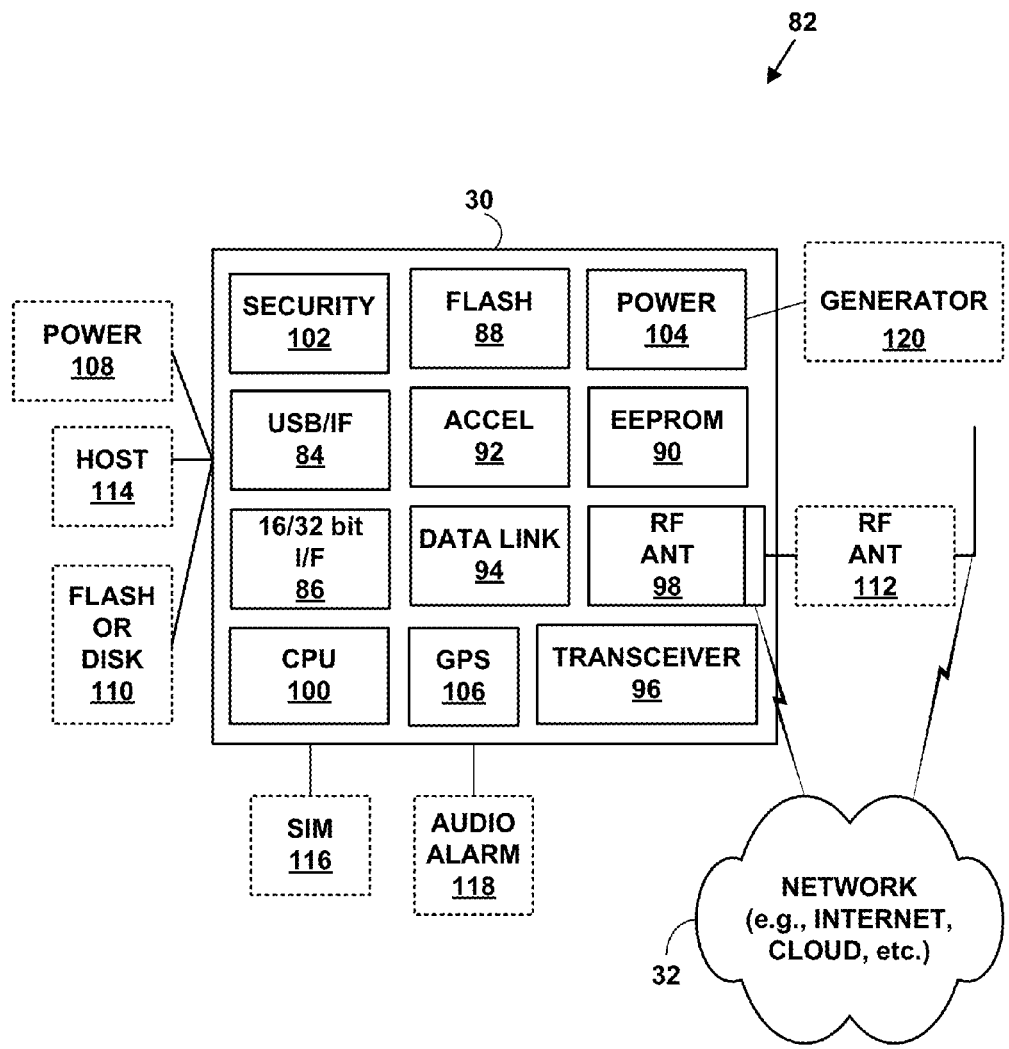
FIG. 9 is a block diagram illustrating a details of the location component of the mobile lock.

FIG. 9 is a block diagram illustrating a details of the location component 30 of the mobile lock 12.

The location component 30 and/or the unlocking component 24 includes a wireless interface to a wireless communications network 32, including but not limited to, a wireless messaging network, a wireless cellular telephone network, a Packet Cellular Network (PCN), Global System for Mobile Communications, (GSM), Generic Packet Radio Services (GPRS), Global Positioning System (GSP) network, Personal Communications Services network (PCS), a Cellular Digital Packet Data (CDPD), Wireless Application Protocol (WAP), Digital Audio Broadcasting (DAB) network, Transmission Control Protocol (TCP)/User Datagram Protocol (UDP)/Internet Protocol (IP) network, Voice over IP (VoIP) network, Short Messages Service (SMS), Instant Message (IM) or other types of wireless network.

The wireless cellular telephone network includes, but is not limited to Code Division Multiple Access (CDMA), Time Division Multiple Access (TDMA), or other wireless technologies.

The communications network 32 includes, but is not limited to, a wired and/or wireless communications network 32 comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 32.

PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operates in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

GSM is another type of digital wireless technology widely used throughout Europe, in Australia, India, Africa, Asia, and the Middle East. GSM is gaining popularity in the United States. GSM is a wireless platform based on TDMA to digitize data. GSM includes not only telephony and Short Message Services (SMS) but also voice mail, call forwarding, facsimile, caller ID, Internet access, and e-mail.

GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

CDPD is a wireless standard providing two-way, 19.2-Kbps or higher packet data transmission over existing cellular telephone channels. A Packet Cellular Network (PCN) includes various types of packetized cellular data.

IP is an addressing protocol designed to route traffic within a network or between networks. For more information on IP see IETF RFC-791 incorporated herein by reference.

TCP provides a connection-oriented, end-to-end reliable protocol designed to fit into a layered hierarchy of protocols that support multi-network applications. For more information on TCP see RFC-793, incorporated herein by reference.

UDP provides a connectionless mode of communications with datagrams in an interconnected set of networks. For more information on UDP see ITEF RFC-768 incorporated herein by reference.

VoIP is a set of facilities for managing the delivery of voice information using IP packets. In general, VoIP is used to send voice information in digital form in discrete data packets (i.e., IP packets) over data networks rather than using traditional circuit-switched protocols used on the PSTN. VoIP is used on both wireless and wired data networks.

VoIP typically comprises several applications (e.g., Session Initiation Protocol (SIP), Service Location Protocol (SLP), H.323, H.324, Domain Name System (DNS), Authentication Authorization and Accounting (AAA), codecs (G.7xx), etc.) that convert a voice signal into a stream of packets (e.g., IP packets) on a packet network and back again. VoIP allows voice signals to travel over a stream of data packets over a communications network 32.

Short Message Service (SMS) is a text messaging service component of phone, web, or mobile communication systems, using standardized communications protocols that allow the exchange of short text messages of up to 160 characters, or more.

Instant messaging (IM) is a type of messaging which offers real-time text transmission over a local area network (LAN).

The communications network 32 includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

The communications network 32 includes, but is not limited to, one or more target network devices 64, 66, 68 (only three of which are illustrated) each with one or more processors and each with a non-transitory computer readable medium.

The one or more target network devices 64, 66, 68 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV), satellite television (SATV) and Internet television set-top boxes, digital televisions including high definition television (HDTV), three-dimensional (3DTV) televisions and other types of network devices.

The one or more smart network devices 64, 66, 68 include smart phones such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Android is an open source operating system platform backed by Google, along with major hardware and software developers (such as Intel, HTC, ARM, Motorola and Samsung, etc.), that form the Open Handset Alliance.

The one or more smart network devices 64, 66, 68 include tablet computers such as the iPad, by Apple, Inc., the HP Tablet, by Hewlett Packard, Inc., the Playbook, by RIM, Inc., the Tablet, by Sony, Inc.

The target network devices 64, 66, 68 are in communications with the communications network 32 via one or more wired and/or wireless communications interfaces.

The one or more smart network devices 64, 66, 68 include an application 78 which receives and displays location information from the location component 30 on the mobile lock 12. In one embodiment, the application 78 is a cloud application for a cloud communications network.

The communications network 32 includes, but is not limited to, communications over a wire connected to the target network devices, wireless communications, and other types of communications using one or more communications and/or networking protocols.

Plural server network devices 70, 72, 74 (only three of which are illustrated) each with one or more processors and a non-transitory computer readable medium include one or more associated databases 70', 72', 74'. The plural network devices 70, 72, 74 are in communications with the one or more target devices 64, 66, 68 via the communications network 32. The plural server network devices 70, 72, 74 also include an application 78 which receives, transmits, stores in databases 70', 72', 74' and/or displays location information 80 from the location component 30 on the mobile lock 12

The plural server network devices 70, 72, 74, include, but are not limited to, World Wide Web servers, Internet servers, search engine servers, emergency information servers, law enforcement servers, social networking site servers, file servers, other types of electronic information servers, and other types of server network devices (e.g., edge servers, firewalls, routers, gateways, etc.).

The plural server network devices 70, 72, 74 also include, but are not limited to, network servers used for communications.

An operating environment for the network devices 64, 66, 68, 70, 72, 74, and the locator component 30 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Cloud Communications Network

In one embodiment, the communication network 32 includes a cloud communications network 32 comprising plural different cloud component networks. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand mobile device location services. Mobile device location services can unilaterally provision computing capabilities, such as server time and network storage, as needed automatically without requiring human interaction with each network server on the cloud communications network 32.
2. Broadband network access. Mobile device location service capabilities are available over plural broadband communications networks and accessed through standard mechanisms that promote use by heterogeneous thin or thick client platforms (e.g., mobile phones, smart phones 68, tablet computers 64, laptops 66, PDAs, etc.). The broadband network access includes high speed network access such as 3G and/or 4G wireless and/or wired and broadband and/or ultra-broad band (e.g., WiMAX, etc.) network access.

TABLE 1-continued

3. Resource pooling. Mobile device location service computing resources pooled to serve multiple requesters using a multi-tenant model, with are different physical and virtual resources dynamically assigned and reassigned according to Mobile device location service demand. There is location independence in that an requester of location information 80 has no control and/or knowledge over the exact location of the provided by the Mobile device location service resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for Mobile device location services. To the Mobile device location services, the Mobile device location services storage and retrieval capabilities available for provisioning appear to be unlimited and can be used in any quantity at any time.
5. Measured Services. Cloud computing systems automatically control and optimize resource use by leveraging a metering capability at some level of abstraction appropriate to the type of Mobile device location service (e.g., storage, processing, bandwidth, custom mobile device location services applications, etc.). Mobile device location service usage is monitored, controlled, and reported providing transparency for both the Mobile device location service provider and the mobile device location requester of the utilized mobile device location service.

Exemplary cloud computing service models appear in Table 2. However, the present invention is not limited to these service models and more, fewer or other service models can also be used to practice the invention.

TABLE 2

1. Cloud Computing Software Applications for a Mobile Device Location Services (CCSA ). The capability to use the provider's applications 78 running on a cloud infrastructure. The cloud computing applications 78, are accessible from the server network device 70, 72, 74 from various client devices 64, 66, 68 through a thin client interface such as a web browser, etc. The user does not manage or control the underlying cloud infrastructure including network, servers, operating systems, storage, or even individual application 78 capabilities, with the possible exception of limited user-specific application configuration settings.
2. Cloud Computing Infrastructure for the Mobile Device Location Services (CCI). The capability provided to the user is to provision processing, storage and retrieval, networks and other fundamental computing resources where the consumer is able to deploy and run arbitrary software, which can include operating systems and applications 78. The user does not manage or control the underlying cloud infrastructure but has control over operating systems, storage, deployed applications, and possibly limited control of select networking components (e.g., host firewalls, etc.).
3. Cloud Computing Platform for the an Mobile Device Location Services (CCP). The capability provided to the user to deploy onto the cloud infrastructure is provided using programming languages and tools supported servers 70, 72, 74 etc. The user is not requried manage or control the underlying cloud infrastructure including network, servers, operating systems, or storage, but has control over the deployed applications 78 and possibly application hosting environment configurations.

Exemplary cloud computing deployment models appear in Table 3. However, the present invention is not limited to these deployment models and more, fewer or other deployment models can also be used to practice the invention.

TABLE 3

1. Private cloud network. The cloud network infrastructure is operated solely for mobile device location services. It may be managed by the Mobile device location service or a third party and may exist on premise or off premise.
2. Community cloud network. The cloud network infrastructure is shared by several different organizations and supports a specific mobile TABLE 3-continued device location community that has shared concerns (e.g., mission, security requirements, policy, compliance considerations, etc.). It may be managed by the different organizations or a third party and may exist on premise or off premise.
3. Public cloud network. The cloud network infrastructure such as the Internet, PSTN, SATV, CATV, Internet TV, etc. is made available to the general public or a large industry group and is owned by one or more organizations selling cloud services.
4. Hybrid cloud network. The cloud network infrastructure is a composition of two and/or more cloud networks (e.g., private, community, and/or etc.) and/or other types of public and/or private networks (e.g., intranets, public, etc.) that remain unique entities but are bound together by standardized or proprietary technology that enables data and application portability (e.g., cloud bursting for load-balancing between clouds, etc.)

Cloud software 78 for mobile device location services takes full advantage of the cloud paradigm by being service oriented with a focus on statelessness, low coupling, modularity, and semantic interoperability for mobile device location services. However, cloud software services can include various states.

Cloud storage of desired mobile device location information on a cloud computing network includes agility, scalability, elasticity and multi-tenancy. Although a storage foundation may be comprised of block storage or file storage such as that exists on conventional networks, cloud storage is typically exposed to requesters of desired mobile device location information as cloud objects.

In one exemplary embodiment, the cloud application 78, offers cloud services for mobile device location services. The application 78 offers the cloud computing Infrastructure as a Service (IaaS), including a cloud software infrastructure service for mobile device location, the cloud Platform, as a Service (PaaS) including a cloud software platform service for mobile device location and/or offers Specific cloud software services as a Service (SaaS) including a specific cloud software service for mobile device location. The IaaS, PaaS and SaaS include one or more of cloud services comprising networking, storage, server network device, virtualization, operating system, middleware, run-time, data and/or application services, or plural combinations thereof, on the cloud communications network 32.

Location Information Services

The location component 30 provides location information via television services, Internet television services, search engine services, social networking services, social shopping sites, law enforcement sites and/or emergency information services. However, the present invention is not limited to the services described and more, fewer and/or other Television Services In one embodiment, the location component 30 provides location information 80 of the mobile device 48 via television services over the communications network 32. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the location component 30 provides location information 80 of the mobile device 48 via tInternet television services over the communications network 32. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other network device.

"Web-TV" delivers digital content via broadband and mobile networks. The digital content is streamed to a viewer's set-top box, game console, computer, or other network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

Search Engine Services

In one embodiment, the location component 30 provides location information 80 of the mobile device 48 via from general search engine services. A search engine is designed to search for information on the communications network 32 such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the location component 30 provides location information via from general search engine services. In another embodiment. In one embodiment, the location component 30 provides location information via from general search engine services. The location components provides location information by interacting with one or more other public search engines (e.g., GOOGLE, BING, YAHOO, etc.) and/or private search engine services.

In one embodiment, the location component 30 provides location information from specialized search engine services, such as vertical search engine services by interacting with one or more other public vertical search engines (e.g., GALAXY.COM, etc.) and/or private search engine services.

However, the present invention is not limited to such general and/or vertical search engine services and more, fewer and/or other general search engine services can be used to practice the invention.

Social Networking Services

In one embodiment, the location component 30 provides location information 80 of the mobile device 48 via from one more social networking services including to/from one or more social networking web-sites (e.g., FACEBOOK, U-TUBE, TWITTER, MY-SPACE, MATCH.COM, E-HARMONY, GROUP ON, SOCIAL LIVING, etc.). The social networking web-sites also include, but are not limited to, social couponing sites, dating web-sites, blogs, RSS feeds, and other types of information web-sites in which messages can be left or posted for a variety of social activities.

Social Shopping Services

In one embodiment, Ithe location component 30 provides location information 80 of the mobile device 48 via from one more social networking services including to/from one or more social shopping sites (e.g., CRAIG'S LIST, E-BAY, AMAZON.com, etc.) that sell new and used items. The social shopping sites also include, but are not limited to, e-commerce sites, blogs, RSS feeds, and other types of information web-sites in which messages can be left or posted for a variety of new and used items that are offered for sale.

However, the present invention is not limited to the social networking services described and other public and private social networking services can also be used to practice the invention.

Emergency Services

In one embodiment, the location component 30 provides location information 80 of the mobile device 48 to one or more different types of emergency services (e.g., police, fire, etc.) via 911, enhanced 911 (E911), next generation 911 (NG-911), etc. messages to emergency services and/or law enforcement and/or search and rescue and/military personnel.

However, the present invention is not limited to such wireless interfaces and wireless networks and more, fewer and/or other wireless interfaces can be used to practice the invention.

Law Enforcement Services

In one embodiment, the location component 30 provides location information 80 of the mobile device 48 to one or more different types of law enforcement services (e.g., police, FBI, Homeland Security, etc.) or law enforcement personnel.

In one embodiment, all of the services just described are provided as cloud services on a cloud communications network.

However, the present invention is not limited to such wireless interfaces and wireless networks and more, fewer and/or other wireless interfaces can be used to practice the invention.

Security and Encryption

The unlocking component 24 and the location component 30 of the present invention include plural security and/or encryption methods for secure communications. The wireless and wired signal detected and/or sent and/or received are done so securely with the plural security and/or encryption methods described herein to/from the communications network 30.

For example, Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

The IEEE 802.11 Working Group is working on a security upgrade for the 802.11 standard called "802.11i." This supplemental draft standard is intended to improve WiLAN security. It describes the encrypted transmission of data between systems 802.11x WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

A way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

The cable unlocking component 24 includes an opening for inserting a mechanical device (e.g., key 28, keycard 26', etc.) and/or a receiver for receiving an electrical signal from an electrical device or target network device 64, 66, 68. For example, the cable unlocking component 24 may be locked and unlocked with a wireless signal such as an 802.11xx, NFC, M2M, RFID, Bluetooth, InfraRed, WiMAX, WiFi, magnetic, biometric, etc. signal from the target network devices 64, 66, 68. The cable unlocking component 24 is illustrated as an opening for inserting a mechanical device. However, the present invention is not limited to such an embodiment.

In one embodiment, the mobile lock is integral to a mobile device. For example, in such an embodiment, the body component 14 is specifically sized and shaped to fit within the frame 52 of the bicycle 48. The retractable cable 16 is extracted from and released back into the body component 14 within the bicycle frame 52. FIG. 6 illustrates mobile lock 12 as a different color 54. However, the present invention is not limited to this embodiment and the mobile lock 12 typically would be same color as the frame of the bicycle 48 frame 52. The cable attaching component 22 and the cable unlocking component 24 protrude from a surface of the frame 52 of the bicycle 48.

Location Component

In one embodiment, the location component 30 includes a circuit configured for sending and receiving wireless communications information comprising: a universal serial bus (USB) interface (I/F) 84, a selectable communications bit-interface (e.g., 16/32 bit) 86, a flash memory 88, an erasable electronically programmable read only memory (EEPROM) 90, an accelerometer 92, a data-link chip 94 (e.g., Medium Access Control (MAC) chip, etc.), a baseband and/or ultra wideband transciever (e.g., Zigbee, Bluetooth, WiFi, WiMax, cellular, etc.) 96, a wireless Radio Frequency (RF) antenna 98, a processor and/or CPU 100, a security interface 102, an internal power source 104, a GPS chip set 106. However, the present invention is not limited to this embodiment and more, fewer or other components can also be used to practice the invention.

The USB interface 84 provides an interface to the location component 30 for programming. In another embodiment, the USB interface 84 is not used and the location component 30 is programmed wirelessly via the RF antenna 98.

The selectable communications bit-interface 86 provides a selectable send/receive bit rate. One or more types of non-transitory computer readable mediums are used, including but not limited to RAM, flash memory 88, EEPROM 90, etc.

The flash memory 88 allows storing of programmable information for the location component 30. The flash memory 88 is used with and/or without the EEPROM 90.

The EEPROM 90 includes one or more software modules used for networking (e.g., TCP/IP/UDP, etc.), security or for other purposes. The EEPROM 90 is used with and/or without flash memory 88.

In another embodiment, the location component 30 includes only the flash memory 88, or only the EEPROM 90, but not both.

An accelerometer 92 is a device that measures an acceleration of a mobile device and a change of velocity of a mobile device. Many smart phones, digital audio players and personal digital assistants routinely include accelerometers for user interface control; often the accelerometer is used to present landscape or portrait views of the device's screen, based on the way the device is being held. The accelerometer is used to detect tampering impacts to the mobile lock 12. For example, if the mobile lock 12 is hit with a hammer or other mechanical tool or if someone tries to pry the mobile lock 12 off a mobile device and/or if someone tries to use physical force to try an dislodge the tamper resistant component 20 from the cable attaching component 22.

The accelerometer 92 is also used to detect crash-strength G-forces and automatically translate and provide GPS and/or 3D (X,Y,Z) geo-space location information into a current physical location of the mobile device for emergency response personal. For example, if a person riding a bicycle 48 including the mobile lock 12 was hit bit a vehicle the accelerometer 92 would detect the impact and send emergencies messages (e.g., 911, E911, NG-911, etc.) to emergency personnel.

The data-link chip 94 (e.g., Medium Access Control (MAC) chip, etc.) provides data-link layer communications.

The baseband and/or ultra wideband transceiver (e.g., Zigbee, Bluetooth, WiFi, WiMax, cellular, etc.) 96 is a transceiver in which information is carried in digital form in one or more channels on a transmission medium. A baseband includes any frequency band on which information is superimposed, whether or not a frequency band is multiplexed and on which digital information can be sent on sub-bands. However, the present invention is not limited to this embodiment and more, fewer or other types of transceivers can also be used to practice the invention. A non-baseband and/or non-ultra wideband transceiver can also be used to practice the invention.

The wireless Radio Frequency (RF) antenna 98 provides wireless communications. The processor and/or CPU 100, provides internal processing and timing for the internal components of the location component 30.

The security interface 102, is hardware component (e.g., a circuit configured for) providing one or more of the security and/or encryption methods (e.g., WEP, DES, RSA, MD-5, etc.) described herein. The security interface 102 also provides security functionality to the retractable cable 16, the one or more wires 17, the cable attaching component 22, cable unlocking component 24 and the attachment component 28 as was described above. The security interface 102 also generates one or more different types of messages (e.g., email, SMS, IM, voice, 911, E911, NG-911, etc.) when the mobile lock is tampered with as is described herein. However, the present invention is not limited to the security interface sending the one or more different types of messages and other components of the mobile lock can be used to send the messages. In one embodiment, the security interface 102 is not a separate hardware component but includes one more software modules included in the EEPROM 90 and/or in the flash memory 88. However, the present invention is not limited such the embodiments described and the security interface 102 can include, more, fewer or other features and components for practicing the invention.

The internal power source 104 includes a battery, chargeable capacitor, etc. to provide power to the components of the location component 30. In one embodiment, the internal power source 104 is insertable/removable. In one embodiment, the internal power source 104 is rechargeable, and is recharged via the USB interface 84. In another embodiment, the internal power source 104 is not rechargeable (e.g., battery, etc.) and requires replacement. In another embodiment, the mobile lock is connected with a wired and/or wireless connection to a mechanical generator 120 which generates power for the power source. For example, the mechanical generator 120 may be connected to a wheel of a bicycle 48 to provide power to the power source 104 and/or re-charge the power source when the bicycle is being ridden and is moving. However, the present invention ins not limited to such embodiments and other embodiments can be used to practice the invention.

The GPS chip set 106 send and receives GPS information. In one embodiment, the GP chip set 106 is not a separate hardware component but includes one more software modules included in the EEPROM 90 and/or in the flash memory 88.

In another embodiment, the GPS chip set 106 is not included and other types of location information circuits are used. In another embodiment, no location information circuits are used at all. However, the present invention is not limited to these embodiments and other embodiments can be used to practice the invention.

In one embodiment, location component 30 further comprises an external power source 108 (e.g., via USB connection, a LAN connection (e.g., Power over Ethernet (PoE), etc.), an external flash memory or external disk drive 110, an external wireless radio frequency (RF) front end 112 (e.g., a wireless RF antenna, etc.) and an external host network device 114 (e.g., computer, PDA, mobile phone, smart phone, tablet computer, etc.) and/or a subscriber identification module (SIM).

The external flash or disk drive 110 includes, but is not limited to, a removable device such as a Compact Flash (CF), Secure Digital Card (SD), Memory Stick (MS), Micro Drive, MultiMediaCard (MMC) xD-Picture Card (xD), SmartMedia (SM) card or other removable device.

In one embodiment, if the external wireless RF front end is used, the internal RF antenna 98 may be eliminated.

However, the present invention is not limited to this additional embodiment and more, fewer or other components can also be used to practice the invention.

In one embodiment, the location component 30 uses mobile device tracking attaining to obtain a current position of a a mobile device 48 (e.g., bicycle 48, etc.) stationary or moving. Localization may occur either via multilateral of radio signals between (several) radio towers of the communications network 32 and the mobile device 48, or simply via GPS. To locate the mobile device 48 using multi-lateration of radio signals, it must emit at least a roaming signal to contact the next nearby antenna tower, but the process does not require an active call. GSM is based on the signal strength to nearby antenna masts.

Mobile positioning, which includes location based service that discloses the actual coordinates of a mobile device 48, is a technology used by telecommunication companies to approximate where a mobile device is, and thereby also its user (bearer), temporarily resides. The more properly applied term locating refers to the purpose rather than a positioning process. Such service is offered as an option of the class of location-based services (LBS).

The technology of locating is based on measuring power levels and antenna patterns and uses the concept that a powered mobile device 48 always communicates wirelessly with one of the closest base stations, so knowledge of the location of the base station implies the mobile device is nearby.

Advanced systems determine the sector in which the mobile device 48 resides and roughly estimate also the distance to the base station. Further approximation can be done by interpolating signals between adjacent antenna towers. Qualified services may achieve a precision of down to 50 meters in urban areas where mobile traffic and density of antenna towers (base stations) is sufficiently high. Rural and desolate areas may see miles between base stations and therefore determine locations less precisely.

Localization-Based Systems can be broadly divided into: (1) Network-based; (2) Application-based; (3) SIM-based; (4) Hybrid; and/or (5) Wi-Fi based. However, the present invention is not limited to this embodiment, and more fewer or other types of LBS systems can be used to practice the invention.

Network-based techniques utilize the service provider's network infrastructure 32 to identify the location of the mobile device 48.

Application-based technology determines a location of the mobile device 48 by computing its location by identification, signal strengths of the home and neighboring cell towers, which is continuously sent to the server network devices 72, 74, 76. In addition, if the mobile network device 48 is also equipped with GPS then significantly more precise location information is then sent Subscriber identity module or subscriber identification module (SIM) is an integrated circuit that securely stores the international mobile subscriber identity (IMSI) and the related key used to identify and authenticate subscribers on mobile devices 48. Using SIM, it is possible to obtain raw radio measurements from the mobile device 48. The measurements that are available can include the serving mobile network device 48 identification, round trip time and signal strength.

Hybrid positioning systems use a combination of network-based and mobile device 48 technologies for location determination. One example would be some modes of Assisted GPS, which can both use GPS and network information to compute the location of the mobile network device 48.

Wi-Fi data can also be used to identify a mobile device's 48 location. Poor performance of the GPS-based methods in indoor environments and increasing availability of Wi-Fi network in all types of businesses, have provided new methods to carry out Wi-Fi-based indoor positioning of a mobile device 48.

In one embodiment, the location component 30 includes a set of pre-determined coordinates, in two-dimensional (2D) geo-space or three-dimensional (3D) (X,Y,Z) space coordinates, which are also called "geo-coordinates." However, present invention is not limited to such and embodiment other types of location finding methods may be used to practice the invention.

The pre-determined coordinates are translated into a physical geographic location 80 for mobile device (e.g., bicycle 48) including, but not limited to, a room on a building floor, a building floor in a building, a building on a street, enterprise, campus, village, town, city, state, country or continent or other global region, etc.

In one embodiment, the location information 80 of the mobile device 48 is constantly updated in real-time (e.g., milliseconds, seconds, etc.). In another embodiment, the location information 80 is updated in non-real-time time frames (e.g., hours, days, etc.). When the mobile network moves 48, a notification is automatically sent to the other network devices 72, 74, 76 via the communications network 32. Thus, a current geo-location of the mobile device 48 is always known.

In another embodiment, the mobile device 48 is a "dumb device," that is, it does not know its own location. In such an embodiment, the mobile device 48 periodically sends a wireless signal via the communications network 32 to location server 72, 74, 76. If the mobile device 48 is a dumb device, a location server 72, 74, 76 acts a proxy for the dumb device and the location server, 72, 74, 76 automatically determines and always knows the geo-location of the dumb device 48.

In one embodiment, the current physical location 80 of the mobile device (e.g., bicycle 48, etc.) is automatically determined by the location component 30 using 3D (X,Y,Z) space. The 3D (X,Y,Z) space of the bicycle 48 includes a current physical location of the bicycle 48 on land (e.g., street, highway, floor on a parking garage, length, width, height from a know physical point (e.g., longitude and latitude and elevation, cell tower location, etc.) in water and/or in the atmosphere and/or in space. In such an embodiment, the location component 30 periodically and automatically sends a current location in 3D (X,Y,Z) space to one or more server network devices 72, 74, 76 on the communications network 32.

In another embodiment, the current physical location 80 of the bicycle 48 is automatically determined by the location component 30 using GPS coordinates (e.g., longitude, latitude, elevation, etc.). The GPS coordinates are obtained from a GPS satellite by the locator component 30, the application 78 on the target network devices 66, 68, 70 and server network devices 72, 74, 76 via the wireless communications network 32.

GPS is a space-based global navigation satellite system (GNSS) that provides reliable location and time information in all weather and at all times and anywhere on or near the Earth. A GPS receiver calculates its position by precisely timing signals sent by GPS satellites. A GPS receiver uses the messages it receives to determine a transit time of each message and computes a distance to each GPS satellite. These distances along with the satellites' locations are used with the possible aid of triangulation, depending on which algorithm is used, to compute a current physical position of the GPS receiver. This position is then displayed. Latitude and longitude and/or elevation information may also be displayed. Many GPS units also show derived information such as travel direction and speed, calculated from position changes. The GPS coordinates include standard GPS, GPS map, Digital GPS (DGPS) and/or other types of GPS information.

In one embodiment, the current physical location 80 of the mobile device 48 is automatically determined by the location component 30 if the mobile device is stolen. The location component 30 receives an emergency wireless signal from a target network device 64, 66, 68, to indicate the bicycle 48 has been stolen. In such an embodiment, the location component 30 automatically and periodically broadcasts a wireless signal (e.g., an emergency signal, a special theft signal, etc.) that indicates the mobile device 48 has been stolen. The emergency wireless signal can be tracked by law enforcement.

In one embodiment, after the location component 30 receives a wireless signal from a target network device 64, 66, 68, indicating that the mobile device 48 has been stolen, the location component 30 sends one or more different messages to television services, Internet television services, social networking services and/or emergency services with a digital picture and textual or multi-media description of the bicycle 48 includes its manufacturer, model type, color, serial number, etc. The location component 30 also automatically posts the same information on social networking sites such as Facebook, Twitter, etc. indicating the mobile device 48 was stolen. The location component 30 also automatically posts a message to social shopping sites offering items for sale such as Craig's List, E-Bay, etc. with a digital picture and textual or multi-media description of the stolen mobile device 48 includes its manufacturer, model type, color, serial number, etc. with an indication not to purchase the item and/or not to re-sell the item and/or to contact law enforcement if the mobile device 48 should be recognized by anybody.

In one embodiment, when the location component 30 receives a wireless signal indicating the mobile device 48 has been stolen, the location component 30 automatically sends out wireless signals to any target network device 64, 66, 68 and/or server network device 72, 74, 76 that the bicycle 48 passes in close proximity to with NFC and/or M2M communications protocols. In such an embodiment, every time a stolen bicycle 48 passed a target device 64, 66, 68, it would send a wireless message and an owner of the target device 64, 66, 68, would be made aware the bicycle 48 was reported as stolen and the owner should notify law enforcement authorities that their device (e.g., smart phone, tablet, hand-held game platform, etc.) has encountered a stolen item.

In another embodiment, the location component 30 includes records time and distance traveled, an amount of calories used, etc. for a user of the mobile device. The application 78 on the target network devices 64, 66, 68, then processes the information and displays it for a user of the device. A user of the mobile device can use information from the mobile device 48 for health and/or fitness purposes.

In one embodiment, the mobile lock 12 further includes an audio alarm component 118 (FIG. 10) inside the body component 14 that produces a loud audio sound if the retractable cable 16, the body component 14, cable lock end component 18, 20, the cable attaching component 22 and/or the cable unlocking component 24 is tampered with.

In one embodiment, the mobile lock 12 end a wireless signal to a remote receiver if the retractable cable 16, the body component 14, cable lock end component 18, 20, the cable attaching component 20 is tampered with, and/or the cable unlocking component 24 is tampered with. The wireless signal is received on a target network device 64, 66, 68 and/or a server network device 70, 72, 74.

In one embodiment, the location component 30 can be used as an "electronic fence" to prevent a mobile device 48 from entering a geographical area that is set up as being restricted. For example, a location component 30 on a bicycle 48 for a child may be configured to prevent the child from entering a high-traffic area. In such an embodiment, the location component 30 will sound the audio alarm component 118 and/or send a message (e.g., e-mail, text, IM, social networking post, etc.) to a parent and/or guardian indicating the bicycle is entering a restricted location.

In one embodiment, the location component 30 can be used in real-time (e.g., within a few seconds of an event, etc.) to follow an electronic trail and/or an "electronic bread crumb" trail to track where a mobile device 48 is being moved. For example, a location component 30 on a stroller for a babysitter sitting for a child may be configured to track the location of the stroller. In such an embodiment, the location component 30 sends plural messages (e.g., e-mail, text, IM, social networking post, etc.) in real-time and/or posts a current physical location of the stroller on a graphical map (e.g., Google maps, etc.) and a route used to get to the current physical location to allow a parent and/or guardian to track a location in real-time. In one embodiment, the application 78 on the target network device 64, 66, 68 accepts the messages from the location component via the communications network 32 and displays them in real-time.

In another embodiment, the location component 30 is attached to a mechanical button that automatically generates an emergency event wireless signal to indicate an operator of the mobile device 48 is experiencing a criminal, terrorist, etc. event. In another embodiment, the location component 30 accepts a wireless signal (e.g., from a smart phone 68, tablet 60, key fob, etc.) to generate the emergency event.

However, the present invention is not limited to the embodiments just described and more, fewer and/or other embodiments can be used to practice the invention.

The mobile lock 12 has been described for use with bicycles 48. However, it is not limited to this embodiment and can also be used for securing, plural different types of mobile devices, including but not limited to, motorcycles, scooters, mopeds, baby carriages, sports equipment, construction equipment, and/or other personal property, equipment, etc. to prevent theft.

A mobile lock with a retractable cable is described herein. The mobile lock is an integral component of a mobile device (e.g., bicycle, scooter, stroller, etc.) or attachable thereto and includes retractable cable that is wrapped around a stationary object (e.g., tree, bike rack, etc.). The retractable cable reconnects to a lock component on a body component of the mobile lock to prevent theft of the mobile. The mobile lock is always available for locking the mobile device. The mobile lock also includes an integral wireless locator system that can precisely locate the mobile device in real-time if stolen.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

I claim:

1. A mobile lock comprising:
   a body component with a retractable cable;
   one end of the retractable cable including a cable lock end component that is insertable into and removable from a cable attaching component and a second end of the retractable cable attached to a cable retraction component that retracts the retractable cable into the body component when not in use;
   one end of the cable lock end component including a tamper resistant component to prevent tampering at a connection between the cable lock end component and the cable attaching component and a second end of the cable lock end component including an engaging portion to securely engage the cable lock end component into the cable attaching component;
   the cable attaching component integral to the body component for securely engaging the second end of the cable lock end component of the retractable cable when the retractable cable is being used to secure a mobile device to a solid object;
   a cable unlocking component for unlocking the second end of cable lock end component from the cable lock component;
   an attachment component connected to the body component for attaching the mobile lock to the mobile device;
   a location component inside the body component with a circuit configured for providing real-time physical location information of the mobile device and for securely and wirelessly communicating with a communications network via a wireless interface, the location component including at least: a non-transitory memory, a baseband transceiver or an ultra-wideband transceiver, a wireless Radio Frequency (RF) antenna, a processor, a security interface, an internal power source, an accelerometer and a Global Positioning System (GPS) location chip set.

2. The mobile lock of claim 1 wherein the body component comprises a metal, plastic, or composite material.

3. The mobile lock of claim 2 wherein a metal body component includes stamped, cast or forged metals, including, hardened steel, stainless steel or other metals.

4. The mobile lock of claim 2 wherein a plastic body component includes an injection molded, rotation molded, blow-molded, extruded, pultruded or pullwound plastic body component.

5. The mobile lock of claim 4 wherein a molded plastic body component includes thermoplastics comprising Polyethylene, Polyvinyl chloride, Polypropylene, Polyethylene terephthalate, Polymethyl methacrylate, or Polycarbonate thermoplastics.

6. The mobile lock of claim 4 wherein an extruded, pultruded or pullwound plastic body component includes Polyvinyl Chloride (PVC), Acrylonitrile Butadiene Styrene (ABS), High Impact Polypropylene (HIP), Polypropylene, High-Density Polyethylene (HDPE), Polycarbonate, Polyethylene Terephthalate Glycol (PETG), Nylon Fiber reinforced Polypropylene, or Fiber Reinforced Plystyrene plastics.

7. The mobile lock of claim 2 wherein the composite materials include Fiber-reinforced polymers (FRP) including thermoplastic composites, short fiber thermoplastics, long fiber thermoplastics or long fiber-reinforced thermoplastics.

8. The mobile lock of claim 1 wherein the retractable cable includes a hardened component comprising a braided cable, wire rope or chain covered with a plastic or rubber or composite material coating or a cut resistant coating comprising a resistant plastic, and wherein the coating or cut resistant coating on the retractable cable includes one or more integral metal or optical wires used to detect tampering with the retractable cable.

9. The mobile lock of claim 1 wherein the cable attaching component and cable unlocking component include a mechanical lock or an electrical lock.

10. The mobile lock of claim 9 wherein the mechanical lock accepts a mechanical device to lock and unlock the mechanical lock and the electrical lock accepts an electrical signal to lock and unlock the electrical lock, wherein the electrical lock includes a wireless interface.

11. The mobile lock of claim 1 wherein the cable retraction component includes a mechanical spring or an electrical motor.

12. The mobile lock of claim 1 wherein a wireless interface on the location component or the cable unlocking component includes a wireless interface for: a Wireless Personal Area Network (WPAN), Radio Frequency (RF), IEEE 802.11a, 802.11b, 802.11g, 802.11n, 802.15.4 (ZigBee), 802.16a, 802.16g, Wireless Fidelity (WiFi), Worldwide Interoperability for Microwave Access (WiMAX), High Performance Radio Metropolitan Area Network (HIPERMAN) RF Home, Bluetooth, Infrared (IrDA), Radio Frequency Identifier (RFID), Global Positioning System (GPS), Near Field Communications (NFC), Machine-to-Machine (M2M) communications, Internet Protocol (IP), Voice over IP (VoIP), Transmission Control Protocol (TCP)/IP, User Datagram Protocol (UDP)/IP, Short Message Service (SMS) or Instant Message (IM) wireless communications protocol signal.

13. The mobile lock of claim 1 wherein a wireless interface on the location component includes a wireless interface for: a wireless cellular telephone network, a wireless Public Switched Telephone Network (PSTN), a Packet Cellular Network (PCN), Global System for Mobile Communications, (GSM), Generic Packet Radio Services (GPRS), Personal Communications Services network (PCS), a Cellular Digital Packet Data (CDPD), Wireless Application Protocol (WAP), or a Digital Audio Broadcasting (DAB) wireless network.

14. The mobile lock of claim 1 wherein the location component securely communicates with the communications network with a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), HyperText Transport Protocol Secure, (HTTPs), Secure Sockets Layer (SSL), or Transport Layer Security (TLS) method.

15. The mobile lock of claim 1 wherein the wireless communications network includes a plurality of target network devices each with one or more processors and a application for receiving location information from the location component of the mobile lock.

16. The mobile lock of claim 15 the plurality of applications on the plurality of target network devices including access via the communications network to a plurality of television sites, Internet television sites, search engine sites, social networking sites, social shopping sites, law enforcement sites or emergency information sites.

17. The mobile lock of claim 15 wherein the plurality of target network devices include computers, mobile phones, portable game playing devices, smart phones and tablet computers.

18. The mobile lock of claim 1 wherein the location component receives an emergency wireless signal from an application on a target network device with one or more processors via the wireless communications network to indicate the mobile device including the mobile lock has been stolen and wherein the location component on the mobile lock automatically and periodically broadcasts a wireless signal that indicates the mobile device has been stolen allowing the mobile device to be tracked in real-time by law enforcement or emergency services personal.

19. The mobile lock of claim 1 wherein the location component of the mobile lock automatically sends via the communications network one or more different types of messages to a plurality of target network devices, the one or more different types of messages including electronic mail (e-mail) messages, short message service (SMS) messages, instant messages (IM) or voice messages indicating the mobile device has been stolen.

20. The mobile lock of claim 18 wherein the location component automatically posts electronic information about the mobile device indicating the mobile device has been stolen to a plurality of different sites on the communications network including: television sites, Internet television sites, search engine sites, social networking sites, social shopping sites, law enforcement sites or emergency information sites.

21. The mobile lock of claim 1 wherein the location component is configured for assisting preventing the mobile device from entering a restricted geographical area that has been saved in non-transitory storage on the location component, for tracking in real-time on a graphical map a current physical location and a route traveled to the current physical location or provide time, distance or calories burned information to an application on a target network device via the communications network for health and fitness activities completed on the mobile device including the mobile lock.

22. The mobile lock of claim 1 wherein the mobile device includes: bicycles, motorcycles, scooters, mopeds, baby carriages, baby strollers, sports equipment, construction equipment or personal mobile items.

23. The mobile lock of claim 1 wherein the communications network includes a cloud communications network and a plurality of cloud applications for mobile device location comprising: a cloud computing Infrastructure as a Service (IaaS), including a cloud software infrastructure service for mobile device location, a cloud Platform as a Service (PaaS) including a cloud software platform service for mobile device location and a Specific cloud software service as a Service (SaaS) including a specific cloud software service for mobile device location for the mobile lock.

* * * * *